United States Patent
Rübeck (10) Patent No.: US 7,824,589 B2
(45) Date of Patent: Nov. 2, 2010

(54) MULTI-WALL SHEET WITHOUT THE TRIANGLE EFFECT, COATED BY COEXTRUSION

(75) Inventor: Jakob Rübeck, Nidderau (DE)

(73) Assignee: Bayer Polymers Sheet Europe GmbH, Darmstadt (DE)

( * ) Notice: Subject to any disclaimer, the term of this patent is extended or adjusted under 35 U.S.C. 154(b) by 1092 days.

(21) Appl. No.: 10/843,995

(22) Filed: May 12, 2004

(65) Prior Publication Data

US 2004/0229062 A1    Nov. 18, 2004

(30) Foreign Application Priority Data

May 16, 2003   (DE)  .................. 103 22 003

(51) Int. Cl.
 *B29C 47/04* (2006.01)
(52) U.S. Cl. .................. 264/173.12; 264/177.1
(58) Field of Classification Search ........... 264/173.12
 See application file for complete search history.

(56) References Cited

U.S. PATENT DOCUMENTS

| | | | | |
|---|---|---|---|---|
| 3,485,912 A | * | 12/1969 | Chisholm et al. | 264/172.15 |
| 3,606,636 A | | 9/1971 | Glass et al. | 18/13 |
| 3,764,245 A | | 10/1973 | Miyamoto | 425/131 |
| 4,877,657 A | * | 10/1989 | Yaver | 428/31 |
| 4,927,675 A | * | 5/1990 | Adams et al. | 428/35.9 |
| 5,001,177 A | | 3/1991 | Winfried et al. | 524/86 |
| 5,108,835 A | | 4/1992 | Hähnsen et al. | 428/334 |
| 5,112,547 A | * | 5/1992 | Nakashima et al. | 264/167 |
| 5,288,778 A | | 2/1994 | Schmitter et al. | 524/100 |
| 5,662,851 A | * | 9/1997 | Yada et al. | 264/167 |
| 5,980,226 A | * | 11/1999 | Guillemette | 425/113 |
| 6,189,269 B1 | * | 2/2001 | De Zen | 52/220.5 |
| 6,821,609 B2 | | 11/2004 | Mende et al. | 428/178 |
| 2002/0197449 A1 | | 12/2002 | Mende et al. | 428/166 |

FOREIGN PATENT DOCUMENTS

| | | |
|---|---|---|
| DE | 298 23 984 U1 | 4/2000 |
| EP | 110 221 | 6/1984 |
| EP | 774 551 A1 | 5/1997 |
| EP | 1 228 977 A1 | 8/2002 |
| JP | 62-093685 | 4/1987 |
| JP | 2000167902 A | 6/2000 |

OTHER PUBLICATIONS

Patent Abstracts of Japan, Bd. 007, Nr. 063 (M-200), Mar. 16, 1983 & JP 57 207032 A (Hashitmoto Forming Kogyo KK), Dec. 18, 1982.

* cited by examiner

*Primary Examiner*—Monica A Huson
(74) *Attorney, Agent, or Firm*—Connolly Bove Lodge & Hutz LLP

(57) ABSTRACT

Gussetless multi-wall sheets are prepared using a coextrusion process which entails feeding part of the base material directly into and via the male insert of the extrusion die, thereby producing the gussetless sheet.

4 Claims, 5 Drawing Sheets

MULTI-WALL SHEET WITHOUT THE TRIANGLE EFFECT, COATED BY COEXTRUSION

FIELD OF THE INVENTION

The present invention relates to extrusions and in particular to extrusion of thermoplastic materials.

SUMMARY OF THE INVENTION

A process for the production of coextruded gussetless multi-wall sheets is disclosed. Also disclosed is an extrusion die for the production of such sheets. The inventive coextrusion process entails feeding part of the base material directly into the male insert of the multi-wall extrusion die to produce a gussetless sheet

BACKGROUND OF THE INVENTION

Multi-wall sheets are often provided where one or both of the outer coextruded walls are capable of performing any of a variety of functions. For example, one or both outside walls may provide UV protection for the sheet against damage (e.g. yellowing) by UV radiation, but other functions, e.g. IR reflection, are also performed in this way.

The state of the art relating to multi-layer products is summarized below.

EP-A 0 110 221 discloses sheets consisting of two layers of polycarbonate, one layer containing at least 3 wt. % of a UV absorber. These sheets may be produced by coextrusion according to EP-A 0 110 221.

EP-A 0 320 632 discloses moldings consisting of two layers of thermoplastic, preferably polycarbonate, one layer containing a specially substituted benzotriazoles as UV absorbers. EP-A 0 320 632 also discloses the production of these moldings by coextrusion.

EP-A 0 247 480 discloses multi-layer sheets in the structure of which includes a layer of branched polycarbonate and a layer of thermoplastic, the polycarbonate layer containing a specially substituted benzotriazoles as UV absorbers. The production of these sheets by coextrusion is also disclosed.

EP-A 0 500 496 discloses polymer compositions stabilized against UV light with special triazines, and their use as the outer layer on a multi-wall sheet. The polymers mentioned are polycarbonate, polyester, polyamides, polyacetals, polyphenylene oxide and polyphenylene sulfide.

Figure 1:
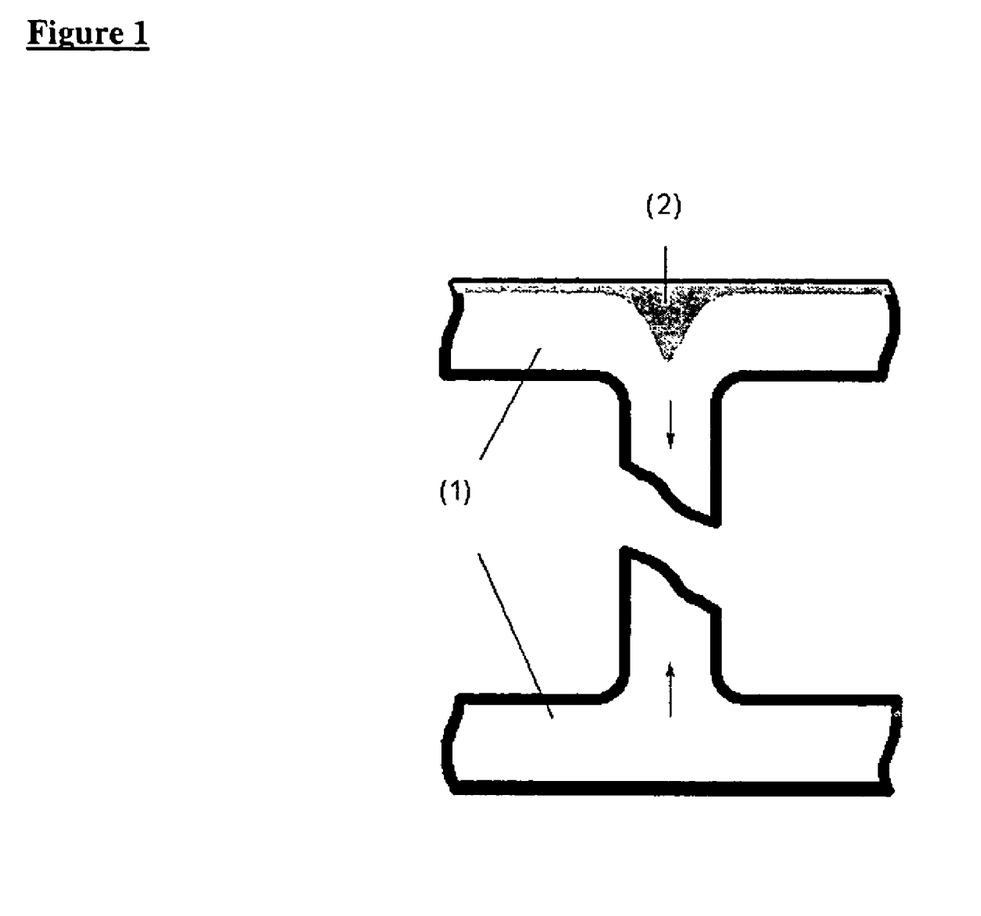
FIG. 1 shows a section through a multi-wall sheet, showing the formation of gussets. Feed of the polymer melt at (1) results in a flow of the polymer melt from the top and bottom into the multi-wall mould (arrows). This in turn leads to the formation of gussets in the coextruded layer (2).

However, all the coextruded multi-wall sheets known from the state of the art exhibit the so-called "triangle effect", a defect resulting upon the coextrusion, described as a combination of gussets consisting of the material making up the coextruded layer with unevenness of the surface of the sheet (FIG. 1).

BRIEF DESCRIPTION OF THE DRAWING

FIG. 5 shows a cross section of one embodiment of the inventive die. Inflow of polymer melt occurs at (12) via channels (13) for feeding melt into the midpart of the male insert (14) of the die. The top and bottom side die lips are-represented by (15) and the sheet exits at (16).

DETAILED DESCRIPTION OF THE INVENTION

Given the state of the art, the objective is therefore to produce a coextruded multi-wall sheet which, in contrast to the state of the art, no longer exhibits the triangle effect.

This object forms the basis of the present invention.

Figure 2:
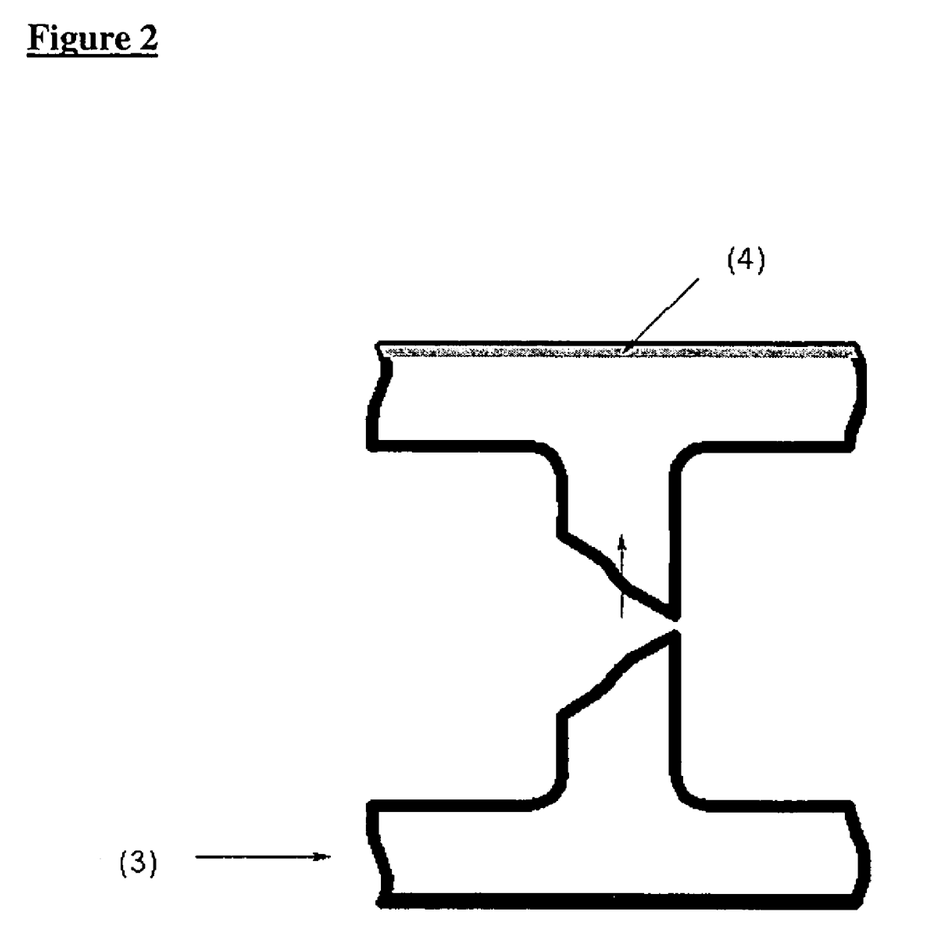
FIG. 2 shows a section through a multi-wall sheet showing the process when pressing more main resin material from the opposite side of the coextruded one. Increased polymer feed from the side opposite to the coextruded side of the sheet (3) leads to a distribution of the melt from bottom to top resulting in a gussetless coextruded layer (4).

In the case of sheets coated-on one side, this problem may be solved with a modified feed of the coextrusion material by increasing the material feed from the non-coextruded side, making it possible to avoid gusset formation on the coextruded side (FIG. 2).

Figure 3:
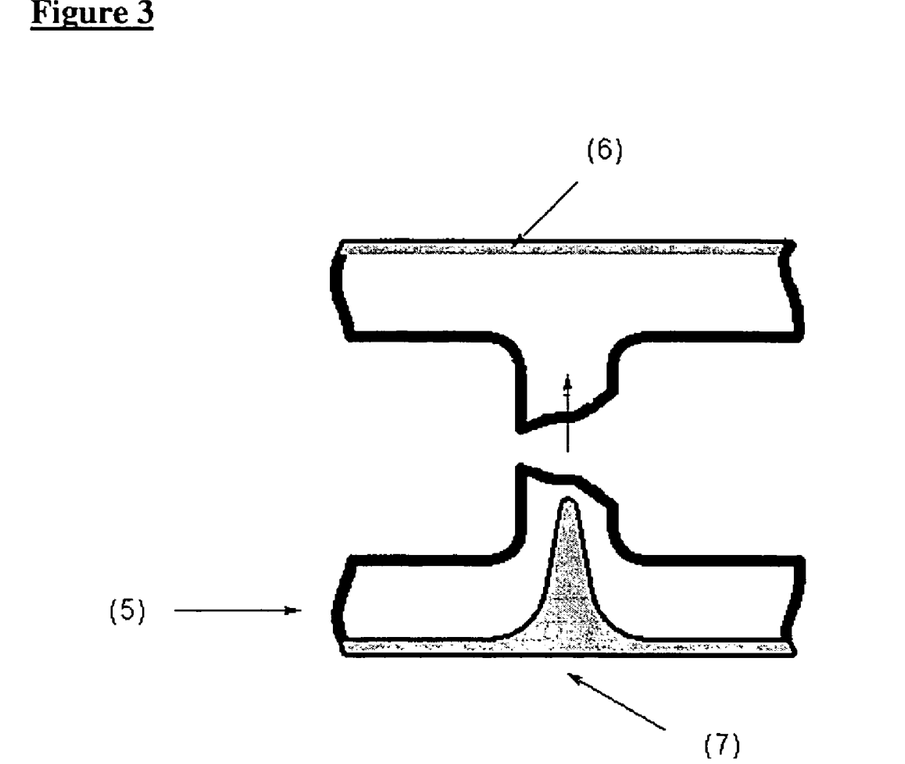
FIG. 3 shows section through a multi-wall plate, showing what this effect would look like with coextrusion both sides of the sheet. Increased polymer feed at (5) will lead to a gussetless coextruded layer (6) and a coextruded layer with a thick gusset (7).

In the case of sheets coextruded on both sides, however, this process is inapplicable. Here, the increased feed from one side would produce a thicker gusset on the other side, so the gain on one side would be offset by a loss on the other side (FIG. 3).

Figure 4:
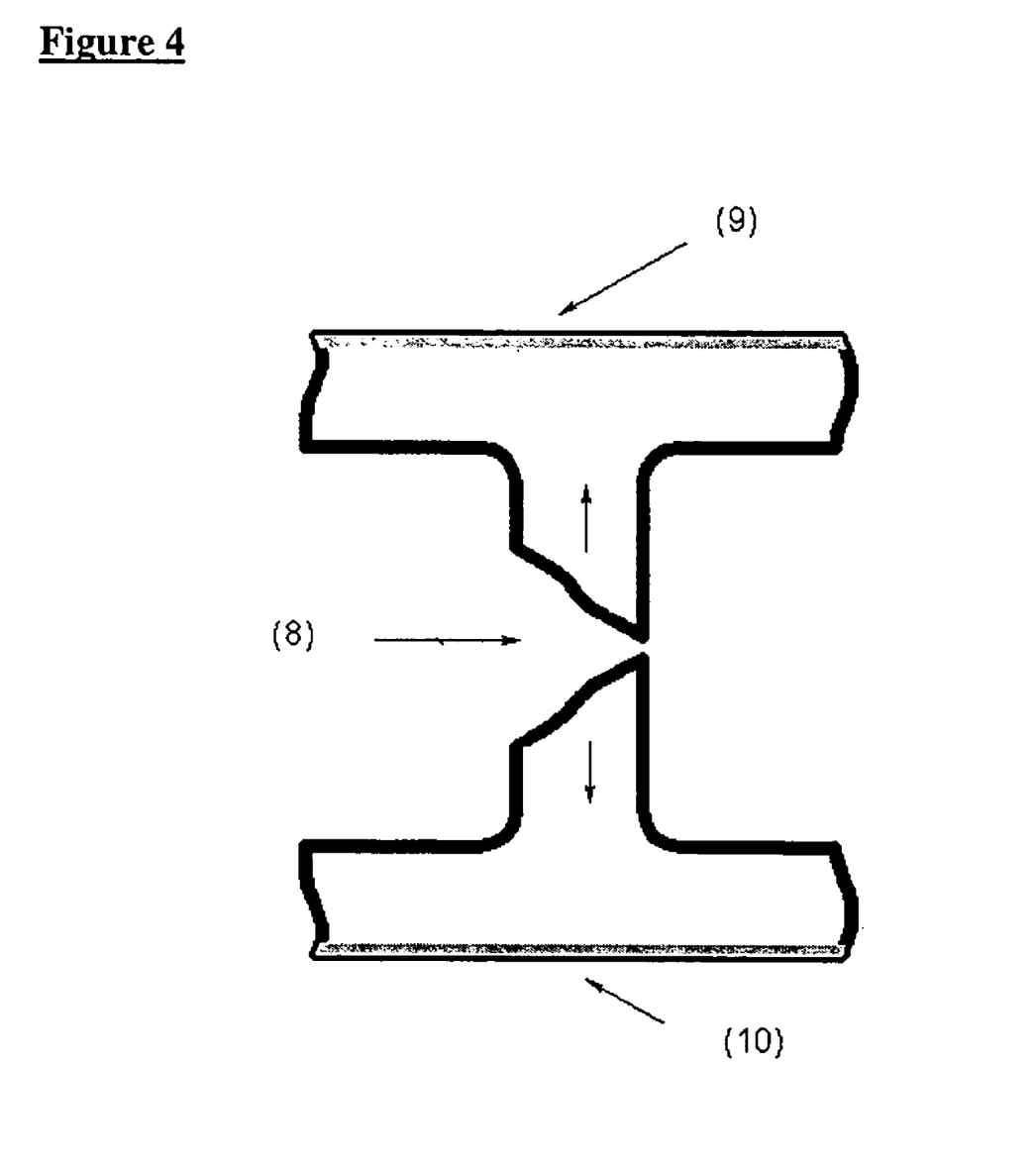
FIG. 4 shows a section through a multi-wall sheet, showing how the process according to the invention works. Additional feed of polymer melt at (8) through a channel into the multi-wall mould completely avoids the triangle effect leading to coextruded layers (9), (10) without gusset formation.

It has now been found, surprisingly, that the gusset formation on each side may be virtually completely avoided by modifying the material flows during extrusion in such a way that a partial flow is tapped from the conventional material flow around the male insert of the die, said partial flow being fed directly into the center of the male insert of the die where mainly the rib of the sheets are formed. The material flow through the male insert is normally divided into an upper and a lower stream which flow together again before the outlet of the die from above and below, to produce the walls. However, this flowing of material from the upper and lower sides creates a typical "draining funnel", which is filled with coextrusion material flowing in. A gusset is formed, as shown in FIG. 1. To enable part of the material to be fed directly into the center of the male insert of the die, according to the invention, the material flow from the outside material streams is reduced or even prevented, as shown in FIG. 4, and the funnel formation and hence the gusset formation or triangle effect is minimized, or preferably even completely avoided, on both sides of the sheet. The process according to the invention is therefore suitable for the production of multi-wall sheets coextruded on one or both sides.

The present invention thus provides a process for applying an outer layer on multi-wall sheets by coextrusion, and the gussetless sheets, or sheets free of the triangle effect, prepared by the process. These sheets are distinguished by a particularly smooth surface and uniform, i.e. gussetless, coextruded layers. A multi-wall sheet coextruded on both sides is a preferred embodiment.

The present invention therefore also provides an extrusion die for carrying out the process according to the invention.

Figure 5:
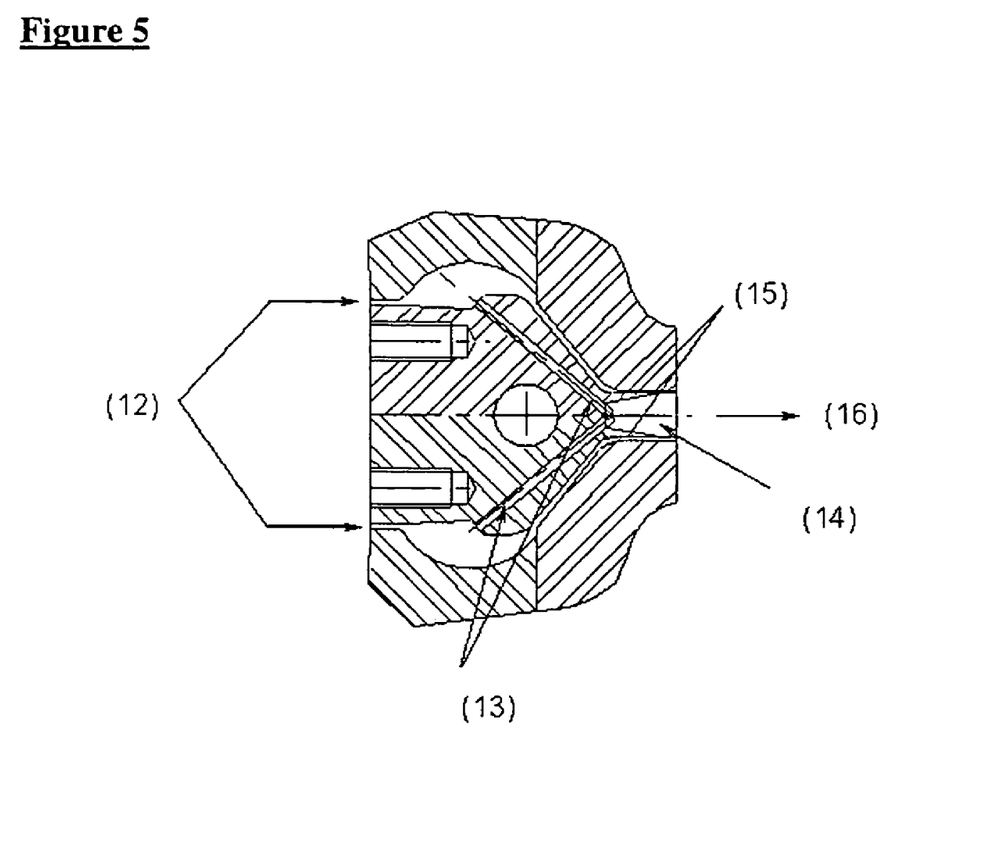

In addition to the conventional channels, sections and molds required for various purposes, are there channels which feed part of the inflowing material directly into the center of the male insert of the die. In a preferred embodiment, the material is fed directly forwards into the male insert from a region at the back of the die (FIG. 5).

The present invention also provides a product containing said sheets. This product, which contains e.g. said coextruded multi-wall sheet, is preferably selected from the group comprising glazing, greenhouses, conservatories, verandas, car ports, bus shelters, roofings, partitions, cash kiosks and solar collectors.

The process according to the invention has the substantial advantage of avoiding the triangle effect, which otherwise has noticeable adverse consequences due to gusset formation and the associated wastage of material, and by an uneven sheet surface. The coating material wasted in the gusset generally contains valuable thermoplastic containing expensive additives. It may be of considerable financial advantage to save such material.

The process according to the invention is suitable for the production of a wide variety of coextruded layers and mainly for any conceivable functional layers, including in combination (UV protection and functional layer, e.g. IR reflection on the top and UV protection on the bottom), and is particularly suitable for the production of multi-wall sheets provided with UV protection on both sides.

The coextruded multi-wall sheets according to the invention have further advantages over the state of the art. They may be produced by coextrusion, affording advantages over a product produced by lacquering. Thus, in contrast to lacquering, no solvents volatilize during coextrusion.

Moreover, lacquers cannot be stored for long periods. Coextrusion does not have this disadvantage.

Also, lacquers demand expensive technology. For example, they require explosion-proof machines and solvent recycling, i.e. high investment in plants. Coextrusion does not have this disadvantage.

A preferred embodiment of the present invention is said multi-wall sheet coextruded on both sides wherein the core material and the coextruded layer can be made of identical or different thermoplastics. Preferably, both layers are based on the same material.

All thermoplastic molding compositions are suitable in the practice of the invention. Examples include one or more of polycarbonate, polyester, polyestercarbonates, polymethyl methacrylates, polystyrenes, SAN, blends of polycarbonate with polyesters and/or polystyrenes and/or SAN.

Preferred base resin material are those containing transparent thermoplastics such as polycarbonate or polymethyl methacrylates. It is particularly preferable to use polycarbonate or polymethyl methacrylates and very particularly preferable to use polycarbonate.

The preparation of these thermoplastics is well known to those skilled in the art and is carried out by the known processes.

According to the invention, the preferred coextruded multi-wall sheets are those in which the coextruded layer additionally contains 1 to 20% relative to the weight of the layer of UV absorbers and has a thickness of 5 to 200 μm, preferably 30 to 100 μm.

The multi-wall sheets may be twin-wall sheets, triple-wall sheets, quadruple-wall sheets, etc. The multi-wall sheets may also have different profiles, e.g. X profiles or XX profiles. The multi-wall sheets may also be corrugated.

A preferred embodiment of the present invention is a multi-wall sheet including a polycarbonate core material and two coextruded layers, arranged on top or underneath, all made of polycarbonate.

Depending on the type of thermoplastics used and the additives they contain, the coextruded multi-wall sheets according to the invention may be translucent, opaque or transparent.

In one particular embodiment, the coextruded multi-wall sheets are transparent.

Both the base material and the coextruded layer(s) of the multi-wall sheets according to the invention may contain additives.

In particular, the coextruded layer may contain UV absorbers and demolding agents.

The UV absorbers or mixtures thereof are present in concentrations of 0-20 wt. %, preferably 0.1 to 20 wt. %, particularly preferably 2 to 10 wt. % and very particularly preferably 3 to 8 wt. %, the percents being relative to the weight of the composition. If two or more coextruded layers are present, the proportion of UV absorbers in these layers may differ.

Examples of UV absorbers that may be used according to the invention are described below:

a) Benzotriazole derivatives of formula (1):

In formula (I), R and X are identical or different and are H, alkyl or alkylaryl.

Preferred representatives are Tinuvin 329, where X=1,1,3,3-tetramethylbutyl and R=H, Tinuvin 350, where X=tert-butyl and R=2-butyl, and Tinuvin 234, where X=R=1,1-dimethyl-1-phenyl.

b) Dimeric benzotriazole derivatives of formula (II):

In formula (II), R1 and R2 are identical or different and are H, halogen, C1-C10-alkyl, C5-C10-cycloalkyl, C7-C13-aralkyl, C6-C14-aryl, —OR5 or —(CO)—O—R5, where R5=H or C1-C4-alkyl.

In formula (II), R3 and R4 are also identical or different and are H, C1-C4-alkyl, C5-C6-cycloalkyl, benzyl or C6-C14-aryl.

In formula (II), m is 1, 2 or 3 and n is 1, 2, 3 or 4.

Preference is given to Tinuvin 360, where R1=R3=R4=H, n=4, R2=1,1,3,3-tetramethylbutyl and m=1.

b1) Dimeric benzotriazole derivatives of formula (III):

wherein the bridge is

R1, R2, m and n are as defined for formula (II), p is an integer from 0 to 3, q is an integer from 1 to 10, Y is —CH2-CH2-, —(CH2)3-, —(CH2)4-, —(CH2)5-, —(CH2)6- or CH(CH3)-CH2- and R3 and R4 are as defined for formula (II).

Preference is given to Tinuvin 840, where R1=H, n=4, R2=tert-butyl, m=1, R2 is in the ortho position to the OH group, R3=R4=H, p=2, Y=—(CH2)5- and q=1.

c) Triazine derivatives of formula (IV):

wherein R1, R2, R3 and R4 are identical or different and are H, alkyl, CN or halogen and X is alkyl.

Preference is given to Tinuvin 1577, where R1=R2=R3=R4=H and X=hexyl, and Cyasorb UV-1164, where R1=R2=R3=R4=methyl and X=octyl.

d) Triazine derivatives of formula (IVa) below:

wherein
R1 is C1-alkyl to C17-alkyl,
R2 is H or C1-alkyl to C4-alkyl, and
n is 0 to 20.

e) Dimeric triazine derivatives of formula (V):

wherein
R1, R2, R3, R4, R5, R6, R7 and R8 may be identical or different and are H, alkyl, CN or halogen and X is alkyl or —(CH2CH2-O—)n-C(=O)—.

f) Diaryl cyanoacrylates of formula (VI):

(VI)

wherein
R1 to R40 may be identical or different and are H, alkyl, CN or halogen.

Preference is given to Uvinul 3030, where R1 to R40=H.

Very particularly preferred UV absorbers are selected from the group comprising Tinuvin 360, Tinuvin 1577 and Uvinul 3030.

Tinuvin 360

Tinuvin 1577

Uvinul 3030

Said UV absorbers are commercially available.

In addition to or in place of the UV absorbers, coextrusion and core resin of the multi-wall sheets may also contain other conventional processing aids, especially demolding agents and flow regulators, as well as the additives conventional for the polycarbonates used, such as stabilizers, especially heat stabilizers, and also colorants, optical brighteners and inorganic pigments.

All the known polycarbonates are suitable as preferred thermoplastics for the multi-wall sheets according to the invention:

These include homopolycarbonates, copolycarbonates and thermoplastic polyestercarbonates.

They have weight average molecular weights w preferably of 18,000 to 40,000, particularly preferably of 26,000 to 36,000 and very particularly preferably of 28,000 to 35,000, determined by gel permeation chromatography calibrated against polycarbonate.

For the preparation of polycarbonates, reference may be made for example to "Schnell, Chemistry and Physics of Polycarbonates, Polymer Reviews, Vol. 9, Interscience Publishers, New York, London, Sydney 1964", to "D.C. PREVORSEK, B. T. DEBONA and Y. KESTEN, Corporate Research Center, Allied Chemical Corporation, Morristown, N.J. 07960, 'Synthesis of Poly(ester)carbonate Copolymers' in Journal of Polymer Science, Polymer Chemistry Edition, Vol. 19, 75-90 (1980)", to "D. Freitag, U. Grigo, P. R. Müller and N. Nouvertne, BAYER AG, 'Polycarbonates' in Encyclopedia of Polymer Science and Engineering, Vol. 11, Second Edition, 1988, pages 648-718" and finally to "Dres. U. Grigo, K. Kircher and P. R. Müller, 'Polycarbonate' in Becker/Braun, Kunststoff-Handbuch, Volume 3/1, Polycarbonate, Polyacetale, Polyester, Celluloseester, Carl Hanser Verlag, Munich, Vienna 1992, pages 117-299".

The polycarbonates are preferably prepared by the interfacial polycondensation process or the melt transesterification process and the preparation is described below using the interfacial polycondensation process as an example.

The compounds that are preferably to be used as starting compounds are bisphenols of the general formula

HO—Z—OH, wherein Z is a divalent organic radical having 6 to 30 carbon atoms and containing one or more aromatic groups.

Examples of such compounds are bisphenols belonging to the group comprising dihydroxybiphenyls, bis(hydroxyphenyl)alkanes, indanebisphenols, bis(hydroxyphenyl) ethers, bis(hydroxyphenyl) sulfones, bis(hydroxyphenyl) ketones and 1,3- or 1,4-bis(hydroxyphenylpropyl)benzenes.

Particularly preferred bisphenols belonging to the above groups of compounds are bisphenol A, tetraalkylbisphenol A, 1,3-bis[2-(4-hydroxyphenyl)-2-propyl]-benzene (bisphenol M), 1,4-bis-[2-(4-hydroxyphenyl)-2-propyl]benzene, 1,1-bis (4-hydroxyphenyl)-3,3,5-trimethylcyclohexane (bisphenol TMC) and optionally mixtures thereof.

Preferably, the bisphenol compounds to be used according to the invention are reacted with carbonic acid compounds, especially phosgene, or, in the case of the melt transesterification process, with diphenyl carbonate or dimethyl carbonate.

Polyestercarbonates are preferably obtained by reacting the above-mentioned bisphenols, at least one aromatic dicarboxylic acid and optionally carbonic acid equivalents. Examples of suitable aromatic dicarboxylic acids are phthalic acid, terephthalic acid, isophthalic acid, 3,3'- or 4,4'-diphenyldicarboxylic acid and benzophenonedicarboxylic acids. Up to 80 mol %, preferably from 20 to 50 mol %, of the carbonate groups in the polycarbonates may be replaced by aromatic dicarboxylic acid ester groups.

Examples of inert organic solvents used in the interfacial polycondensation process are dichloromethane, the various dichloroethanes and chloropropane compounds, carbon tetrachloride, chloroform, chlorobenzene and chlorotoluene.

It is preferable to use chlorobenzene or dichloromethane or mixtures of dichloromethane and chlorobenzene.

The interfacial polycondensation reaction may be accelerated by catalysts such as tertiary amines, especially N-alkylpiperidines, or onium salts. It is preferable to use tributylamine, triethylamine and N-ethylpiperidine. In the case of the melt transesterification process, it is preferable to use the catalysts mentioned in DE-A 42 38 123.

The polycarbonates may be intentionally branched in a controlled manner by using small amounts of branching agents, some suitable branching agents being phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri (4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2, 4-dihydroxyphenyl)propane, hexa(4-(4-hydroxyphenylisopropyl)phenyl)orthoterephthalate, tetra(4-hydroxyphenyl)methane, tetra(4-(4-hydroxyphenylisopropyl)phenoxy)methane, 1,3,5-tris[2-(4-hydroxyphenyl)-2-propyl]benzene, 2,4-dihydroxybenzoic acid, trimesic acid, cyanuric chloride, 3,3-bis(3-methyl-4-hydroxyphenyl)-2-oxo-2,3-dihydroindole and 1,4-bis(4',4''-dihydroxytriphenyl)methyl)benzene, especially 1,1,1-tri(4-hydroxyphenyl)ethane and bis(3-methyl-4-hydroxyphenyl)-2-oxo-2,3-dihydroindole.

The branching agents or mixtures of branching agents optionally to be used concomitantly in an amount of 0.05 to 2 mol %, based on the diphenols used, may be introduced together with the diphenols or else added at a later stage of the synthesis.

The chain terminators used are preferably phenols, such as phenol, alkylphenols like cresol and 4-tert-butylphenol, chlorophenol, bromophenol, cumylphenol or mixtures thereof, in amounts of 1-20 mol %, preferably 2-10 mol %, per mol of bisphenol. Phenol, 4-tert-butylphenol and cumylphenol are preferred.

The chain terminators and branching agents may be added to the syntheses separately or else together with the bisphenol.

The preparation of the polycarbonates by the melt transesterification process is described by way of example in DE-A 42 38 123.

Polycarbonates that are preferred according to the invention are the homopolycarbonate based on bisphenol A, the homopolycarbonate based on 1,1-bis(4-hydroxyphenyl)-3,3, 5-trimethylcyclohexane, the copolycarbonates based on the two monomers bisphenol A and 1,1-bis(4-hydroxyphenyl)-3, 3,5-trimethylcyclohexane, and the copolycarbonates based on the two monomers bisphenol A and 4,4'-dihydroxybiphenyl (DHB).

The homopolycarbonate based on bisphenol A is particularly preferred.

The polymer used may contain stabilizers, examples of suitable stabilizers being phosphines, phosphites, stabilizers containing Si, and other compounds described in EP-A 0 500 496. Examples which may be mentioned are triphenyl phosphites, diphenyl alkyl phosphites, phenyl dialkyl phosphites, tris(nonylphenyl) phosphite, tetrakis(2,4-ditert-butylphenyl)-4,4'-biphenylene diphosphonite and triaryl phosphite. Triphenylphosphine and tris(2,4-ditert-butylphenyl) phosphite are particularly preferred.

These stabilizers may be present in all the layers of the multi-wall sheet according to the invention, i.e. both in the core material base layer and in the coextruded layer(s). It is possible for different additives or concentrations of additives to be present in each layer.

Furthermore, the multi-wall sheet according to the invention may contain 0.01 to 0.5%, relative to the weight of the relevant composition, of esters or partial esters of monohydric to hexahydric alcohols, especially glycerol, pentaerythritol or guerbet alcohols.

Examples of monohydric alcohols are stearyl alcohol, palmityl alcohol and guerbet alcohols.

Glycol is an example of a dihydric alcohol.

Glycerol is an example of a trihydric alcohol.

Pentaerythritol and mesoerythritol are examples of tetrahydric alcohols.

Arabitol, ribitol and xylitol are examples of pentahydric alcohols.

Mannitol, glucitol (sorbitol) and dulcitol are examples of hexahydric alcohols.

The esters are preferably the monoesters, diesters, triesters, tetraesters, pentaesters and hexaesters or their mixtures, especially random mixtures, of saturated C10 to C36 aliphatic monocarboxylic acids and optionally hydroxymonocarboxylic acids, preferably saturated C14 to C32 aliphatic monocarboxylic acids and optionally hydroxymonocarboxylic acids.

The commercially available fatty acid esters, especially of pentaerythritol and glycerol, may contain <60% relative to their weight of various partial esters as a result of the preparative process.

Examples of saturated aliphatic monocarboxylic acids having 10 to 36 C atoms are capric acid, lauric acid, myristic acid, palmitic acid, stearic acid, hydroxystearic acid, arachidic. acid, behenic acid, lignoceric acid, cerotic acid and montanic acids.

Examples of preferred saturated aliphatic monocarboxylic acids having 14 to 22 C atoms are myristic acid, palmitic acid, stearic acid, hydroxystearic acid, arachidic acid and behenic acid.

Saturated aliphatic monocarboxylic acids like palmitic acid, stearic acid and hydroxystearic acid are particularly preferred.

The saturated C10 to C36 aliphatic carboxylic acids and the fatty acid esters are either known as such in the literature or may be prepared by processes known in the literature. Examples of pentaerythritol fatty acid esters are those of the particularly preferred monocarboxylic acids mentioned above.

Esters of pentaerythritol and glycerol with stearic acid and palmitic acid are particularly preferred.

Esters of guerbet alcohols and glycerol with stearic acid and palmitic acid, and optionally hydroxystearic acid, are also particularly preferred.

The esters may be present both in the base layer and in the coextruded layer(s). Different additives or concentrations may be present in each layer.

The multi-wall sheets according to the invention may contain antistatic agents.

Examples of antistatic agents are cationic compounds, e.g. quaternary ammonium, phosphonium or sulfonium salts, anionic compounds, e.g. alkylsulfonates, alkylsulfates, alkylphosphates or carboxylates in the form of alkali metal or alkaline earth metal salts, and non-ionic compounds, e.g. polyethylene glycol esters, polyethylene glycol ethers, fatty acid esters or ethoxylated fatty amines. Preferred antistatic agents are non-ionic compounds.

These antistatic agents may be present in the core material of the multi-wall sheet and in the coextruded layer(s). Different additives or concentrations may be present in each part. The antistatic agents are preferably used in the coextruded layer(s).

The multi-wall sheets according to the invention may contain organic dyes, inorganic coloured pigments, fluorescent dyes and, particularly preferably, optical brighteners.

These colorants may be present in the core material of the multi-wall sheet and in the coextruded layer(s). Different additives or concentrations may be present in the different parts of the sheets.

All the molding compounds and their additives and solvents used to produce the multi-wall sheet according to the invention may be contaminated with respective impurities as a result of their preparative processes and storage, the aim being to work with the cleanest possible starting materials.

The individual constituents may be mixed in known manner, either successively or simultaneously, either at room temperature or at elevated temperature.

The additives, especially the UV absorbers and other additives mentioned above, are preferably incorporated in known manner into the molding compounds for the multi-wall sheets according to the invention, by mixing polymer granules with the additives at temperatures of about 200 to 330° C. in conventional machines, such as internal kneaders, single-screw extruders and double-shaft extruders, for example by melt compounding or melt extrusion, or by mixing solutions of the polymer with solutions of the additives and subsequently vaporizing the solvents in known manner. The proportion of additives in the molding compound may vary within wide limits and depends on the desired properties of the molding compound. The total proportion of additives in the molding compound is preferably up to about 20 wt. %, preferably 0.2 to 12 wt. %, based on the weight of the molding compound.

The UV absorbers may also be incorporated into the molding compounds e.g. by mixing solutions of the UV absorbers, and optionally other additives mentioned above, with solutions of the plastics in suitable organic solvents such as CH2Cl2, halogenoalkanes, halogenoaromatics, chlorobenzene and xylenes. The mixtures of substances are then preferably homogenized in known manner via extrusion; the mixtures of solutions are preferably removed, for example compounded, in known manner by vaporization of the solvent followed by extrusion.

It is possible to go on processing the multi-wall sheets according to the invention e.g. by thermo forming or by means of surface treatments, such as the application of scratch resistant lacquers, water spreading layers, and the like, and the products produced by these processes are also provided by the present invention.

Coextrusion as such is known in the literature (cf. for example EP-A 0 110 221 and EP-A 0 110 238). In the present case the procedure is preferably as follows: Extruders for producing the core material and coextrusion layer(s) are connected to a coextrusion adapter. The adapter is constructed so that the melt forming the coextrusion layer(s) is applied as a thin layer adhering to the melt for the core layer. The melt strand containing segmented coextrusion and core material produced in this way is then converted to the desired shape (multi-wall sheet) in the die connected downstream. The melt is subsequently cooled under controlled conditions in known manner by means of calibrating and then cut into lengths. Optionally, an annealing furnace may be used after sizing in order to remove stresses. In place of the adapter arranged upstream from the die, it is also possible for the die itself to be designed so that the melts are brought together in the die.

The process according to the invention, as illustrated is carried out using a die and male insert combination modified as described above, i.e. with a channel for feeding the material directly into the male insert of the multi-wall die. Accordingly, the present patent application also provides the use of a die male insert combination according to the invention for the production of a gussetless coextruded twin-wall sheet.

The invention is illustrated in greater detail by the following Examples, which do not imply a limitation. The Examples according to the invention merely represent preferred embodiments of the present invention.

The machines and equipment used for the production of multi-layer solid sheets are described below. They comprise:
  the main extruder with a screw of length 25 to 36 D and a diameter of 70 mm to 200 mm, with and without venting,
  one or more coextruders for applying the coextrusion layers, with a screw of length 25 to 36 D, D being the diameter of the extruder, and a diameter D of 25 mm to 70 mm, with and without venting,
  a coextrusion adapter,
  a multi-wall sheet die with special male insert
  a calibration unit,
  a take-off device,
  a roller conveyor,
  a cutting device (saw or knives),
  a delivery table.

The polycarbonate granules of the base material were fed into the hoppers of the main extruder and the coextrusion material was fed into the hoppers of the coextruders. Each material was melted and conveyed in its own cylinder/screw plasticizing system. The material melts were brought together in the coextrusion adapter, passed the multi-wall sheet die and formed a coextruded sheet after leaving the die and being cooled down in the calibration unit. The other devices served to transport the extruded sheets, cut them into lengths and deliver them.

The sheets obtained were then assessed visually.

Polycarbonate twin-wall sheets of the following dimensions were produced:

| Nr. | thickness | rib distance | width | area weight |
|-----|-----------|--------------|---------|-------------|
| 1 | 10 mm | 11 mm | 2100 mm | 1.7 kg/m$^2$ |
| 2 | 10 mm | 11 mm | 2100 mm | 2.0 kg/m$^2$ |
| 3 | 8 mm | 11 mm | 2100 mm | 1.5 kg/m$^2$ |
| 4 | 8 mm | 11 mm | 2100 mm | 1.7 kg/m$^2$ |

They contained no obvious gussets and accordingly did not exhibit the triangle effect.

The following polycarbonates were used as coextrusion material in these experiments:

Makrolon® 1243, a branched bisphenol A polycarbonate containing 0.3 mol % of isatin biscresol as branching agent and having a w of 29,234 and a relative solution viscosity of 0.5 g/100 ml, and Makrolon® 3103, a linear bisphenol A polycarbonate having a w of 31,887 and a relative solution viscosity of 0.5 g/100 ml, as base materials, and DP1-1816, another linear bisphenol A polycarbonate having a w of 33,560 and containing UV stabilizing additives.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coextrusion process comprising:
    feeding at least a core material and a coextrusion material into an extrusion die to produce a multi-wall sheet, the core material of the multi-wall sheet forming first and second walls separated by a plurality of ribs, thereby forming a plurality of inner hollow chambers, wherein the coextrusion material forms an outer layer on at least one of the walls; and
    redirecting part of the core material away from a main stream of the core material and directly into and via a male insert of the extrusion die where the part is recombined with the main stream prior to sheet exit out of the extrusion die, such that the outer layer is substantially gussetless.

2. The process according to claim 1, wherein the feeding is through at least one channel in the die, and directly forwards into the male insert of the die from a region at the back of the die.

3. The process of claim 1 wherein core material is a transparent thermoplastic composition.

4. The process of claim 1 wherein core material is a thermoplastic polycarbonate composition.

* * * * *